United States Patent [19]
Dent

[11] Patent Number: 5,815,531
[45] Date of Patent: Sep. 29, 1998

[54] TRANSMITTER FOR ENCODED DATA BITS

[75] Inventor: Paul W. Dent, Pittsboro, N.C.

[73] Assignee: Ericsson Inc., Research Triangle Park, N.C.

[21] Appl. No.: 662,940

[22] Filed: Jun. 12, 1996

[51] Int. Cl.$^6$ .................................................. H04L 27/36
[52] U.S. Cl. ......................... 375/298; 375/297; 375/308; 332/103
[58] Field of Search .................................... 375/261, 279, 375/281, 298, 308, 297; 332/103

[56] References Cited

U.S. PATENT DOCUMENTS

| | | | |
|---|---|---|---|
| 4,485,357 | 11/1984 | Voorman | 332/17 |
| 4,737,968 | 4/1988 | Norton et al. | 375/296 |
| 5,191,597 | 3/1993 | Ekelund et al. | 375/296 |
| 5,222,103 | 6/1993 | Gross | 375/308 |
| 5,462,355 | 10/1995 | Halloran | 332/103 |
| 5,612,651 | 3/1997 | Chethik | 332/103 |
| 5,694,433 | 12/1997 | Dent | 375/297 |

FOREIGN PATENT DOCUMENTS

| | | |
|---|---|---|
| 0382697 A2 | 8/1990 | European Pat. Off. |
| 0583059 A1 | 2/1994 | European Pat. Off. |

*Primary Examiner*—Temesghen Ghebretinsae
*Attorney, Agent, or Firm*—Burns, Doane, Swecker & Mathis, L.L.P.

[57] ABSTRACT

Quadrature Amplitude Modulated signals are generated from data bits by using a first Quadrature Phase Shift Keying (QPSK) modulator for encoding a first pair of the data bits into one of four carrier signal phases, thereby producing a first QPSK signal. A second QPSK modulator encodes a second pair of the data bits into one of four carrier signal phases, thereby producing a second QPSK signal. The first QPSK signal is amplified to a first power level, and the second QPSK signal is amplified to a second power level. The first and second amplified signals are then combined to produce a signal in which four data bits are encoded. In another aspect of the invention, a new type of modulation, called Offset Quadrature Phase Shift Keying (OQPSK), is used in place of the first and second QPSK modulators, so that an Offset Quadrature Amplitude Modulation (OQAM) transmitter is formed. An OQPSK modulator encodes data bits by encoding a first sub-group of the data bits into a real part of a complex signal at an odd instant of a clock, and by encoding a second sub-group of the data bits into an imaginary part of the complex signal at an even instant of the clock. OQPSK modulation provides the benefit of having all signal transitions being constrained to trajectories around constant radius circles, thereby producing spectral efficiency.

42 Claims, 17 Drawing Sheets

TRANSMITTER FOR ENCODED DATA BITS

BACKGROUND

The present invention relates to the transmission of digital information over channels of limited bandwidth, such as radio channels of telephone lines. The digital information can, for example, comprise digitally coded voice.

It is known that Quadrature Amplitude Modulation (QAM) comprises encoding data bits into complex vector signals in which the real and imaginary parts can each take on one of a multiplicity of levels. For example, in 16 QAM the real part and the imaginary part can each take on one of the four equispaced values 3, 1, −1 or −3. The 4×4 possible points that arise are called the constellation, and are shown in FIG. 1(a). Modulation in accordance with this technique comprises mapping four-bit data values, designated $B_0B_1B_2B_3$, onto the 16 distinct complex signal values, as shown in the figure.

A prior art b 16QAM transmitter for generating the above-described constellation from the four-bit data values is illustrated in FIG. 1(b). A first pair of bits, $B_0B_1$, is supplied to a first 2-bit Digital to Analog (D/A) convertor 101 in order to determine which of four values the real part will attain. A second pair of bits, $B_2B_3$, is supplied to a second 2-bit D/A convertor 103 in order to determine which of four values the imaginary part will attain. Each of the D/A convertors 101, 103 supplies its output to a corresponding one of two low-pass filters 105, 107. The function of the low-pass filters 105, 107 is to contain the transmitted spectrum by smoothing transitions from one value to the next when any of the bits $B_0B_1B_2B_3$ are changed. The low-pass filters 105, 107 are preferably Nyquist filters, which have the property that, at regular sampling times after a bit change, the filter output will exactly attain the value determined by the input bits $B_0B_1B_2B_3$. The smoothed real values 109 are applied to a cosine modulator 113, while the smoothed imaginary values 111 are applied to a sine wave modulator 115. The modulated sine and cosine waves 117, 119 are summed at summation point 121 to form a complex modulated carrier signal 123 which varies in both phase and amplitude. To preserve amplitude variations, the prior art requires that this signal be amplified by a linear power amplifier 125. Due to the Nyquist property of the low-pass filters 105, 107, if the output signal vector 127 is sampled at the proper regular instants, one of 16 complex values will be observed as shown in the grid diagram of FIG. 1(a).

The prior art 16 QAM transmitter has the drawback that the linear power amplifier 125 is not efficient, and if it exhibits distortion or non-linearities, then the desired 16 constellation points are not observed in the output signal vector 127. Equally, if the communications channel including the low pass filters 105, 107 is not strictly Nyquist, intersymbol interference (ISI) will prevent the desired constellation points from being observed.

SUMMARY

According to one aspect of the invention, an inventive transmitter is provided for transmitting Quadrature Amplitude Modulation using coupled, constant envelope transmitter power amplifiers of higher efficiency than linear amplifiers in which a first amplifier of first power level amplifies signals formed from most significant bits of a QAM symbol and a second power amplifier of a lower power level amplifies signals formed from least significant bits of the QAM symbol. In one embodiment, Quadrature Amplitude Modulated signals are generated from data bits by using a first Quadrature Phase Shift Keying (QPSK) modulator for encoding a first pair of the data bits into one of four carrier signal phases, thereby producing a first QPSK signal. A second QPSK modulator encodes a second pair of the data bits into one of four carrier signal phases, thereby producing a second QPSK signal. The first QPSK signal is amplified to a first power level, and the second QPSK signal is amplified to a second power level. The first and second amplified signals are then combined to produce a signal in which four data bits are encoded.

According to a second aspect of the invention, a new, spectrally-efficient modulation is disclosed that is termed Offset Quadrature Phase Shift Keying (OQPSK) modulation, in which data bits are encoded alternately into levels of a cosine wave carrier and levels of a sine wave carrier. In one embodiment, data bits are encoded by encoding a first sub-group of the data bits into a real part of a complex signal at an odd instant of a clock, and by encoding a second sub-group of the data bits into an imaginary part of the complex signal at an even instant of the clock. OQPSK modulation provides the benefit of having all signal transitions being constrained to smooth trajectories around constant radius circles, thereby allowing a better spectral containment when constant envelope power amplifiers are used.

According to a third aspect of the invention, an inventive transmitter is disclosed for Offset Quadrature Amplitude Modulation comprising two or more coupled constant-envelope transmitter power amplifiers that amplify Offset QPSK, MSK or GMSK signals formed respectively from most significant bits and least significant bits of an OQAM symbol.

BRIEF DESCRIPTION OF THE DRAWINGS

The objects and advantages of the invention will be understood by reading the following detailed description in conjunction with the drawings in which.

DETAILED DESCRIPTION

Figure 1A:
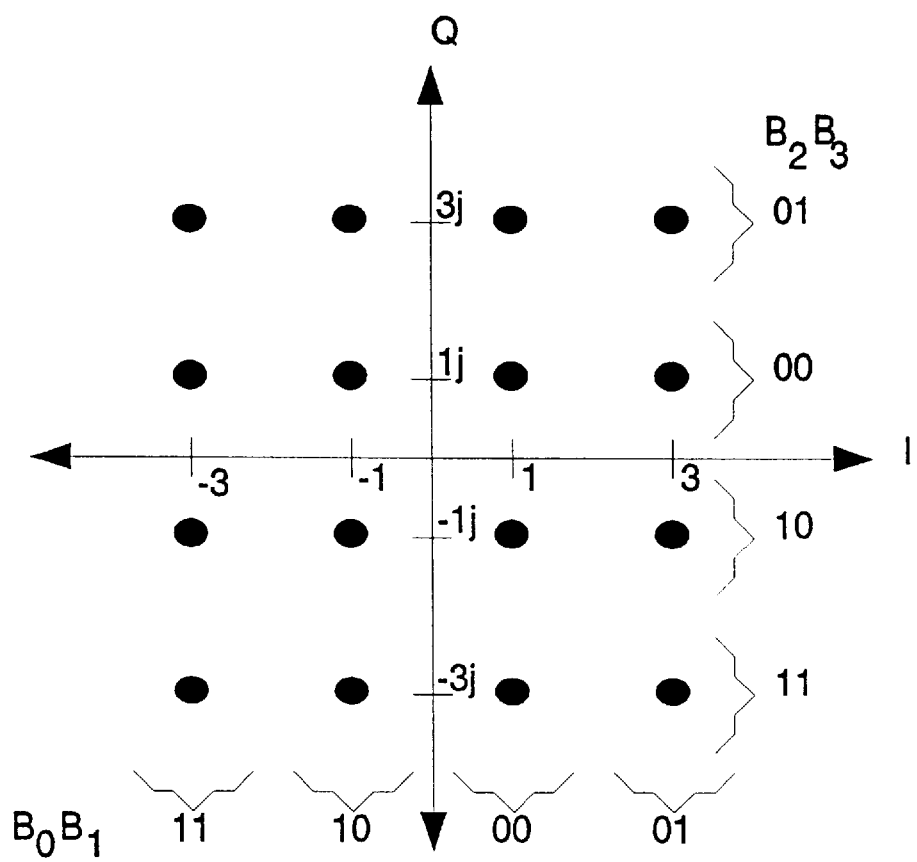
FIG. 1(a) is a grid diagram of a constellation of complex signal values generated in accordance with a prior art 16 QAM transmitter.
Figure 1B:
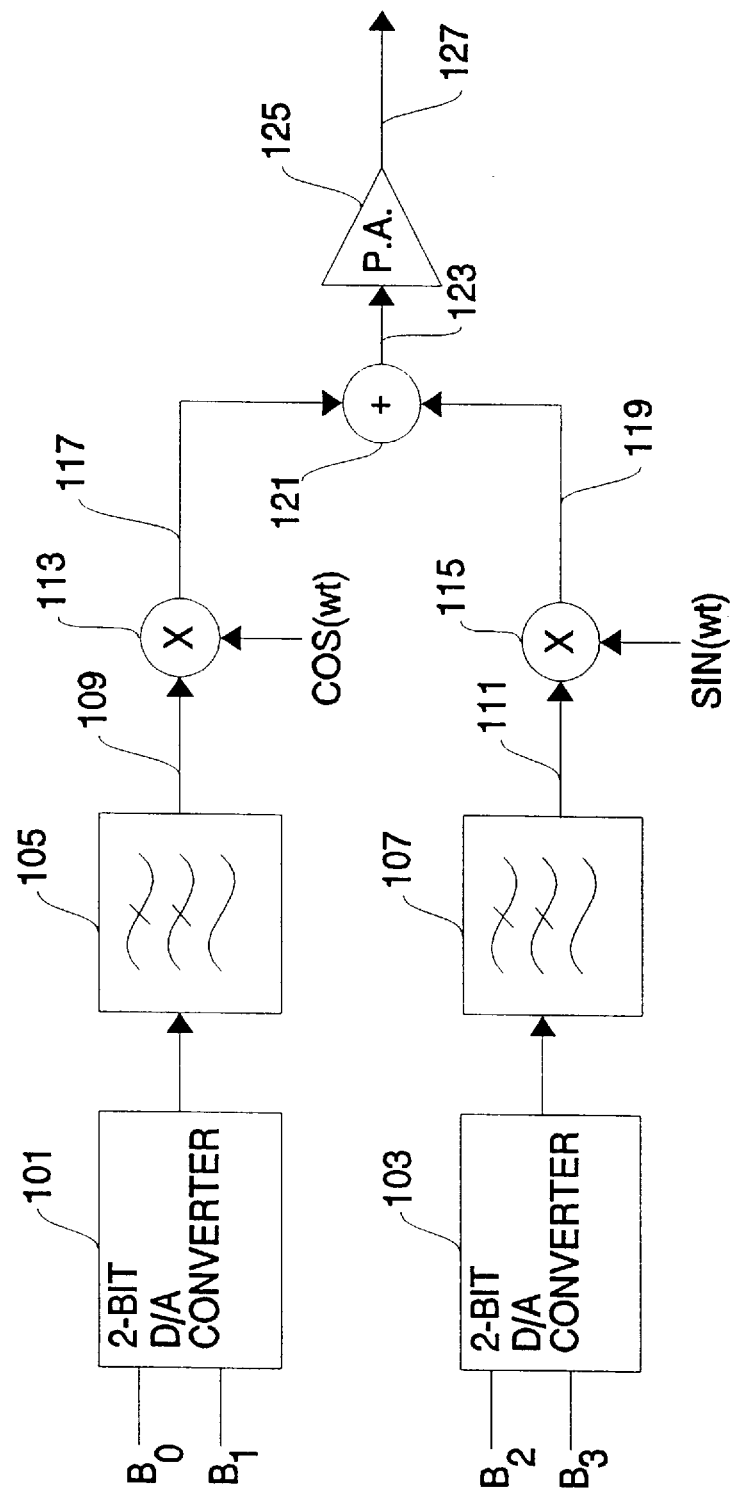
FIG. 1(b) is a diagram of a prior art 16 QAM transmitter.

The various features of the invention will now be described with respect to the figures, in which like parts are identified with the same reference characters.

Figure 2:
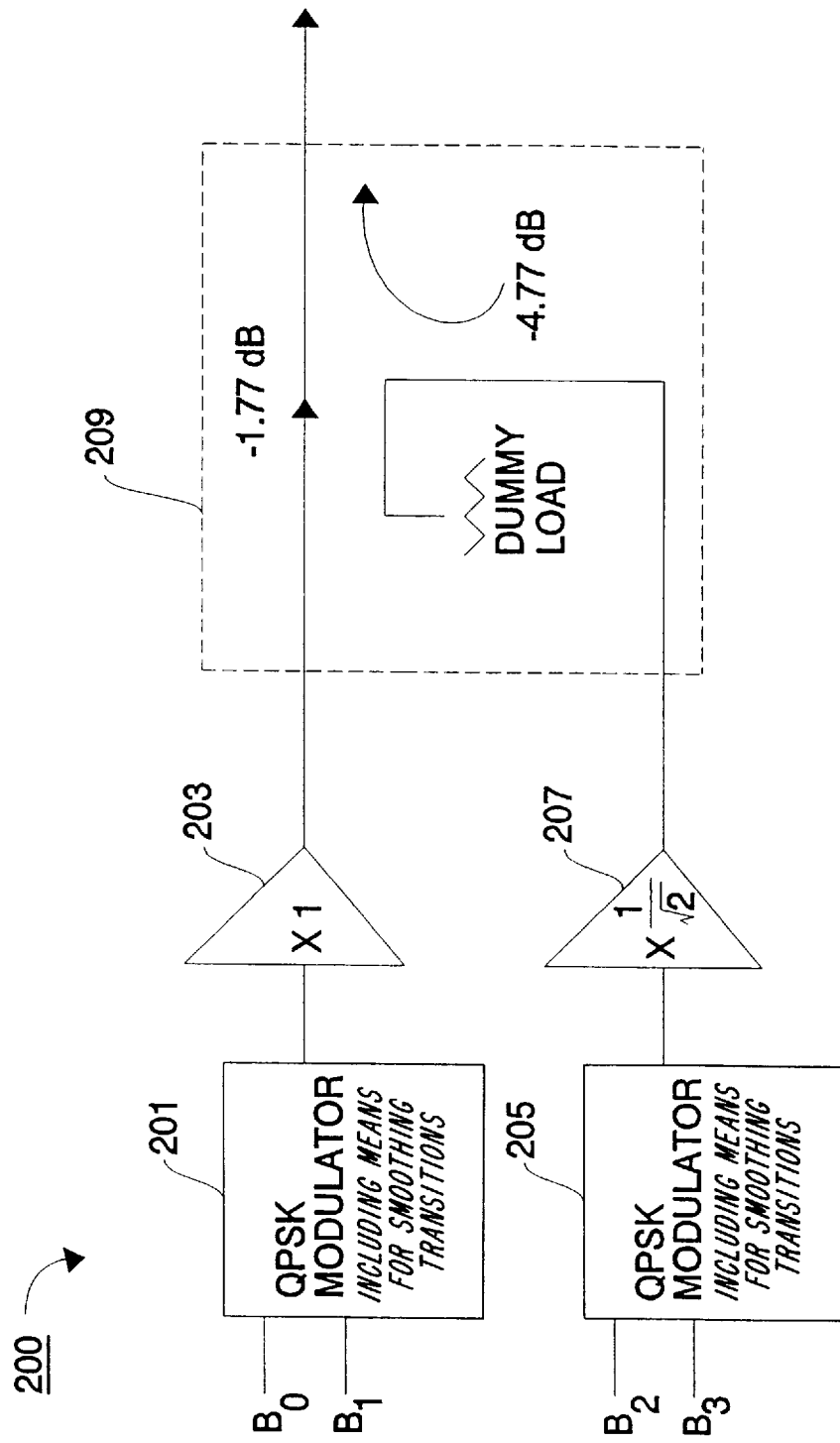
FIG. 2 is a block diagram of a transmitter in accordance with one aspect of the invention.

FIG. 2 is a block diagram of a transmitter 200 in accordance with one aspect of the invention. One advantage of the transmitter 200 is its capability of reproducing the 16 QAM constellation points even if non-linear amplifiers are employed.

Figure 3A:
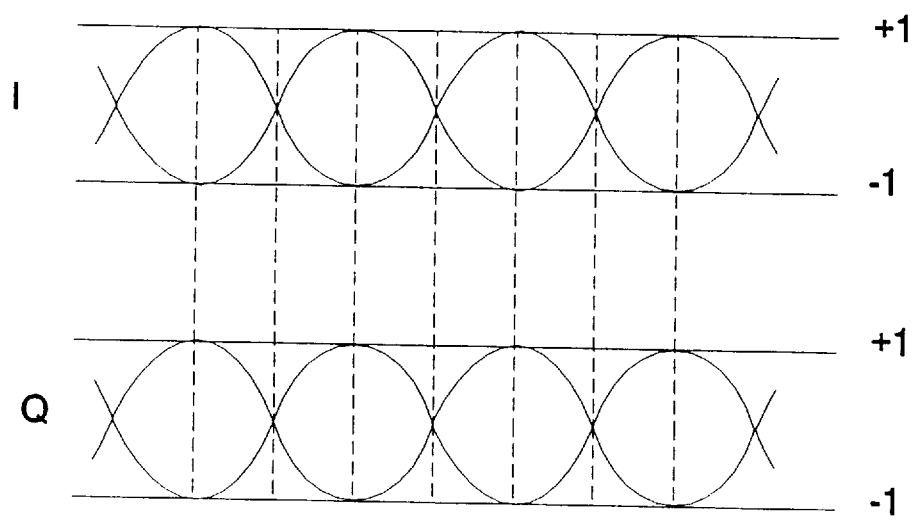
FIGS. 3(a)–3(e) illustrate signals and constellation points associated with various nodes of one embodiment of the inventive transmitter.
Figure 3B:
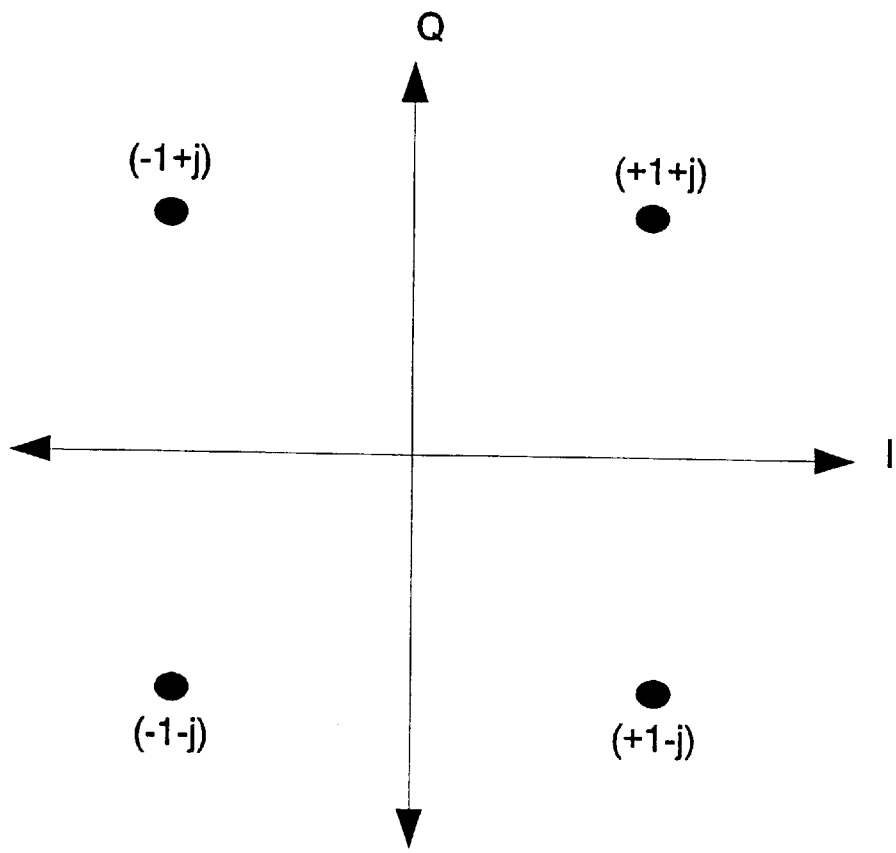

In a preferred embodiment, a first Quadrature Phase Shift Keying (QPSK) modulator 201 receives two information bits, $B_0B_1$, and modulates these onto a carrier wave in accordance with well-known techniques. That is, the QPSK constellation encodes two bits into one of the four vector values ±1±j by changing a real part (I or cosine component) between the values +1 and −1 according to a first information bit and an imaginary part (Q or sine component) between the values +j and −j according to a second information bit. Since all four vectors that can be produced are of the same amplitude (i.e., $\sqrt{2}\approx1.414$), the output signal from the first QPSK modulator 201 can be faithfully amplified by a constant envelope power amplifier 203. The constant envelope power amplifier 203, as well as others employed when practicing the invention, may alternatively be a power amplifier operated at output saturation, a class-C amplifier, or a class-B amplifier. The I and Q components that appear at the output of the constant envelope power amplifier 203 are illustrated in FIG. 3(a), and the corresponding constellation of vectors is shown in FIG. 3(b).

Figure 3C:
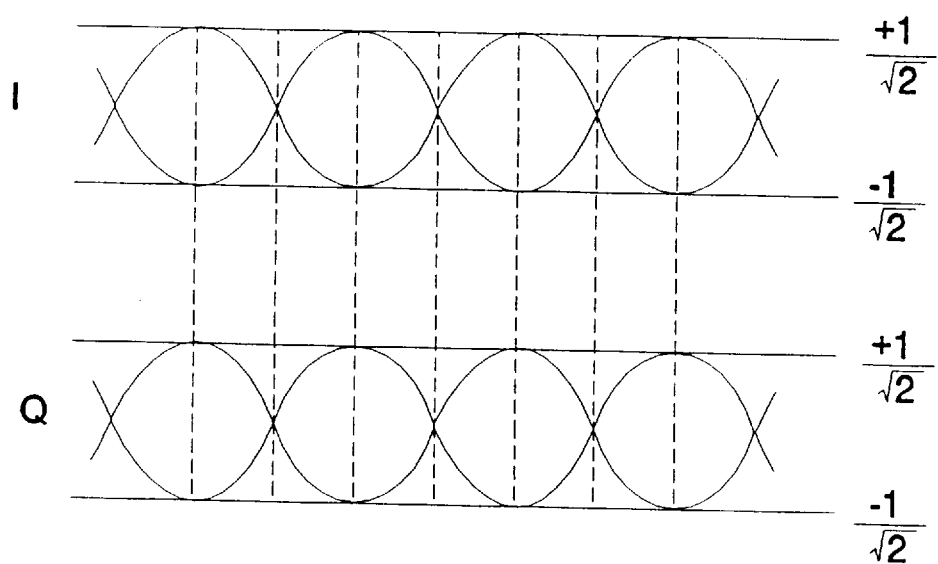
Figure 3D:
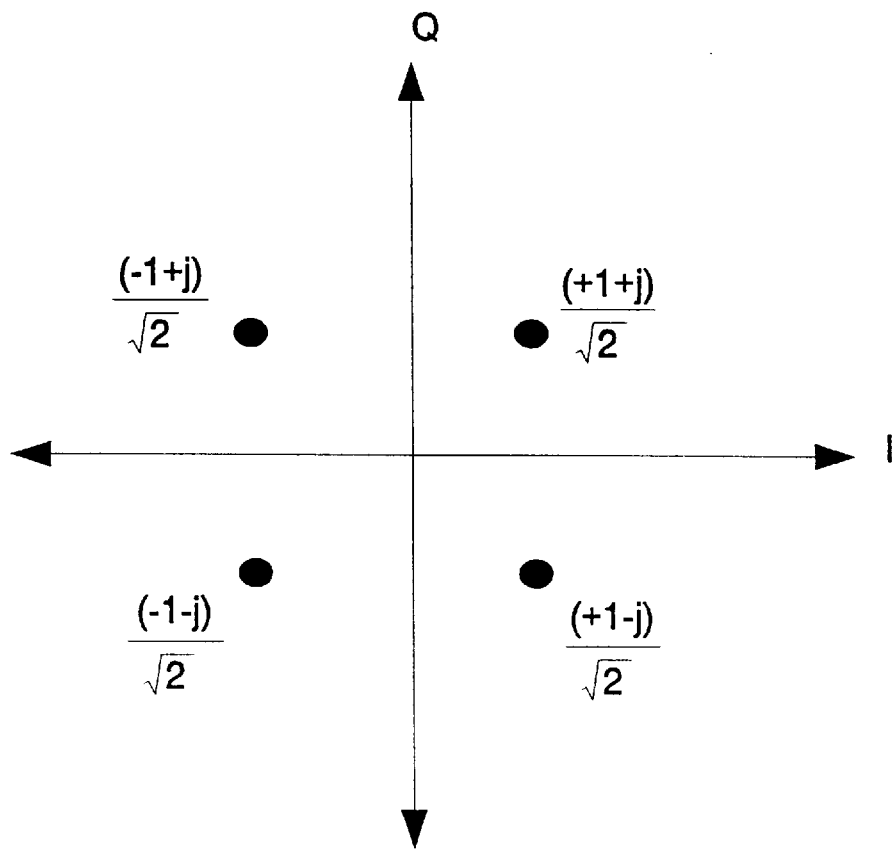

The two remaining information bits, $B_2 B_3$, are encoded into another QPSK constellation by means of a second QPSK modulator 205. The output signal from the second QPSK modulator 205 is then supplied to a second constant-envelope amplifier 207 which faithfully amplifies that signal to a power level that is half that of the first constant-envelope amplifier 203, so that the amplitudes of the I and Q components will be $\frac{1}{\sqrt{2}}$ times that which are produced by the first constant-envelope amplifier 203. The amplified I and Q components that appear at the output of the second constant-envelope amplifier 207 are illustrated in FIG. 3(c). The constellation points generated at the output of the second constant-envelope amplifier 207 are thus described by $$\frac{\pm 1 \pm j}{\sqrt{2}},$$

and shown in FIG. 3(d).

The outputs of the first and second constant-envelope amplifiers 203, 207 are then supplied to respective inputs of means for summing these signals, such as the directional coupler 209 shown in FIG. 2. The directional coupler 209 further scales the lower power signal from the second constant-envelope amplifier 207 by an amount that is $\frac{1}{\sqrt{2}}$ relative to the voltage scaling of the higher power signal from the first constant-envelope amplifier 203. The further scaled signal is then added to the higher power signal. Such scalings that can be achieved using passive, lossless combining networks such as the directional coupler 209 are limited to the values described by k and $\sqrt{1-k^2}$.

To achieve a relative scaling of $\frac{1}{\sqrt{2}}$, the coupling factor k for the lower power signal should be $\frac{1}{\sqrt{3}}$ and then the coupling factor for the higher power signal is:

$$\sqrt{1-k^2} = \sqrt{1-\frac{1}{3}} = \sqrt{\frac{2}{3}} = \frac{\sqrt{2}}{\sqrt{3}}$$

Figure 3E:
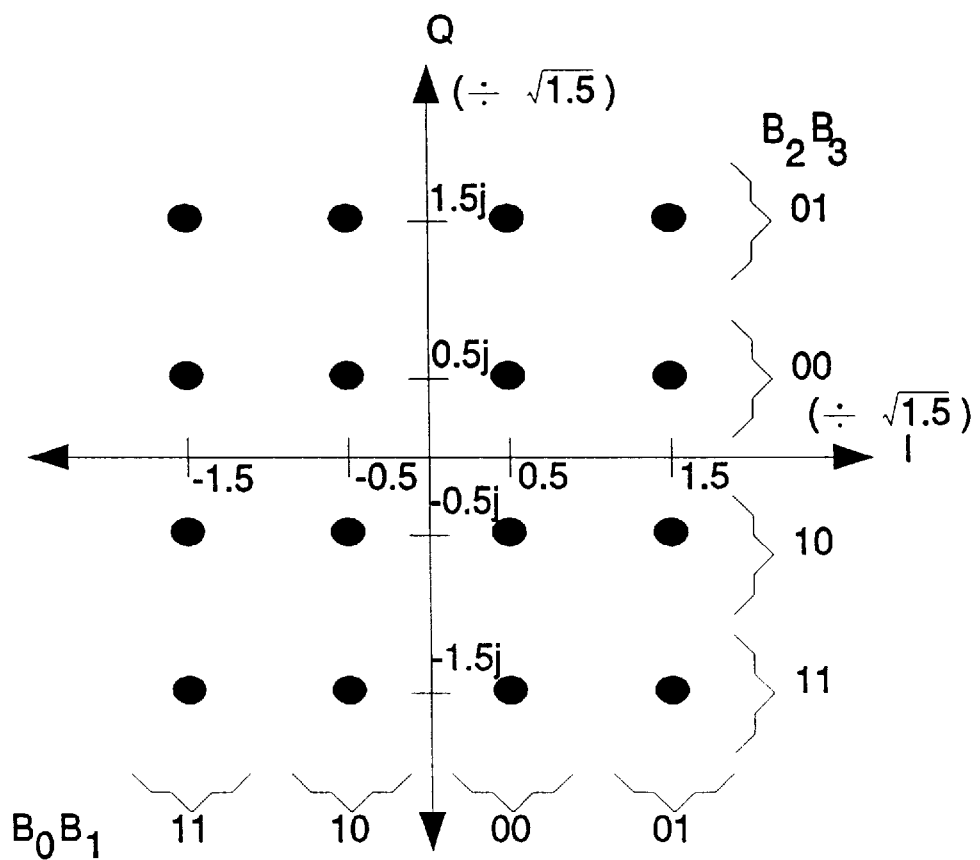

The further relative scaling of $\frac{1}{\sqrt{2}}$ of the lower power signal relative to the higher power signal, combined with its already $\frac{1}{\sqrt{2}}$ signal level relative to the higher power signal, combines to produce a signal of relative level ½ that of the higher power signal. Thus the higher power signal of ±1±j combines with a lower power signal further scaled to $$\frac{\pm 1 \pm j}{2}$$

to produce the sixteen constellation points with real and imaginary parts each taking on one of the four values ±1.5, ±0.5 that are then further reduced by the overall scaling of $\sqrt{2/3}$ produced by the directional coupler 209. For the constellation points of largest magnitude ($\mp1.5\mp1.5j$) the output values from the directional coupler are thus ($\mp\sqrt{3/2} \pm \sqrt{3/2}j$), corresponding to a peak power level of $(\sqrt{3/2})^2 + (\sqrt{3/2})^2 = 3$. This is equal to the sum of the amplifier powers. Therefore, the coupling arrangement is 100% efficient at the peak power output level. Other distributions of the overall scaling of ½ between the signal modulated with the most significant bits and that of the least significant bits could be used, other than allocating $\frac{1}{\sqrt{2}}$ to the power amplifier differences and $\frac{1}{\sqrt{2}}$ to the relative coupling. However, the preferred arrangement gives the maximum efficiency at peak power output points. The 16 QAM constellation points, which are illustrated in FIG. 3(e), are thus faithfully reproduced despite the use of constant envelope (non-linear) amplifiers 203, 207.

In the inventive transmitter shown in FIG. 2, smoothing of transitions between constellation points is accomplished within the first and second QPSK modulators 201, 205 either by smoothing I or Q transitions (so called linear filtering) or by smoothing phase transitions from one point to another. Linear filtering causes the signal to deviate from constant amplitude between constellation points, and the non-linear, constant envelope amplifiers 203, 207 will distort these amplitude variations. Nevertheless, if the vectors arrive at their exact values at a proper sampling time, the constellation points will be reached exactly. The distortion between times gives rise to spectral energy broadening into neighboring channels. Nevertheless, the spectral containment of the transmission using the inventive 16 QAM transmitter can be better than the spectral containment of other, prior art modulations suitable for use with constant envelope power amplifiers. Distortion in power amplifiers may also be reduced by use of well-known prior art predistortion techniques such as described in U.S. Pat. No. 5,191,597 to Ekelund et al., which is hereby incorporated by reference. In Ekelund et al., a method is shown for compensating for non-linearities in an end amplifier having a given transfer function $H_R$, $H_\phi$ (for amplitude and phase, respectively) and included in a radio transmitter of quadrature type for linear, digital modulation, and in which table look-up units (ST, CT) store the digital sine and cosine values (I(t,α), Q(t,α)) of the quadrature components determined by a given signal vector α. According to the method of values of the transfer functions $H_R$, $H_\phi$ for the quadrature modulated radio signals r(t,α) are calculated by addressing memory units which store a number of values of $H_R$ and $H_\phi$. The sine and cosine values of the addressed values of $H_R$ and $H_\phi$ are also formed. The thus calculated values are multiplied by the stored digital values in the table look-up units (ST, CT) and by the inverted value of $H_R$. As a result, new modified values i(t,α), q(t,α) are obtained for the quadrature components, which compensates for the non-linearities in the final amplifier.

It is also possible to smooth transitions between constellation points in a constant amplitude trajectory. For example, the transition between the values 1+j and 1−j in the QPSK constellation produced by the constant envelope amplifier 203 can be achieved by a clockwise movement through 90 degrees around a circle having a radius equal to $\sqrt{2}$. Using QPSK however, transition to a diametrically opposite point can be required, and neither a clockwise nor a counterclockwise rotation through 180 degrees around a constant radius circle provides good spectral containment compared to a transition through the origin, which is a non-constant amplitude transition that may not be handled satisfactorily by the constant envelope amplifiers 203, 207.

According to a further aspect of the invention, a new modulation entitled Offset QAM is provided in which the diametric transitions of the constituent QPSK signals are prevented by changing real and imaginary parts at alternate time intervals instead of at the same time. This modulation in its most general form does not have the property that a data symbol corresponds to one of a number of constellation points on a grid, but rather has the property that half of the underlying data bits are encoded in the real values of a complex signal attained at, say, odd intervals of a data clock and the other half are encoded in the imaginary values of the complex signal attained at, in this example, even intervals of the clock. Of course, the designation of alternate clock intervals as the "odd" or the "even" intervals is arbitrary, and not meant to be limiting. Continuing, however, with our first example, data is decoded or demodulated by sampling the real part of the signal at odd intervals, at which times the imaginary parts are between imaginary values or otherwise indeterminate, and by sampling the imaginary part at even intervals of time when the real part is indeterminate. No grid of constellation points thus exists, but rather a set of imaginary or horizontal "stripes" at even times and a set of real or vertical stripes at odd times.

Offset QPSK has transitions only between, for example, 1+j and 1−j (i.e., through 90 degrees), and never diametric transitions through 180 degrees, such as from 1+j to −1−j. Thus all transitions can be constrained to trajectories around constant radius circles. This constraint yields constant envelope signals that can be amplified by class-C power amplifiers having high efficiency. The spectral containment of the resultant Offset 16 QAM signal is thus improved compared to prior art 16 QAM modulations using non-linear amplifiers.

An embodiment of a transmitter 400 employing Offset 16 QAM will now be described with respect to FIG. 4. In this embodiment, a first Offset QPSK modulator 401 receives two information bits, $B_0 B_1$, and modulates these onto a carrier wave in accordance with the inventive techniques described above. That is, one of the bits, say $B_0$, is encoded by changing a real part (I or cosine component) between the values +1 and −1 at odd intervals of a data clock according to the value of the information bit $B_0$, and the other bit ($B_1$ in this example) is encoded by changing an imaginary part (Q or sine component) between the values +j and −j at even intervals of the data clock according to the value of the information bit $B_1$. These real and imaginary parts are combined within the Offset QPSK modulator 401 and the resulting signal is supplied to a constant envelope amplifier 403. Since all transitions of this signal are constrained to trajectories around constant radius circles, thereby yielding constant envelope signals, these can be faithfully amplified by the constant envelope amplifier 403, which may be a class-C power amplifier having high efficiency. The I and Q components that appear at the output of the constant envelope power amplifier 403 are illustrated in FIG. 5(a). As explained above, this type of modulation does not yield a constellation of point vectors, as in conventional QPSK modulation. Instead, the real components attain values of ±1 at odd clock times when the imaginary components are indeterminate as illustrated in FIG. 5(b), and the imaginary components attain values of ±j at even clock times when the real components are indeterminate, as illustrated in FIG. 5(c).

Figure 5A:
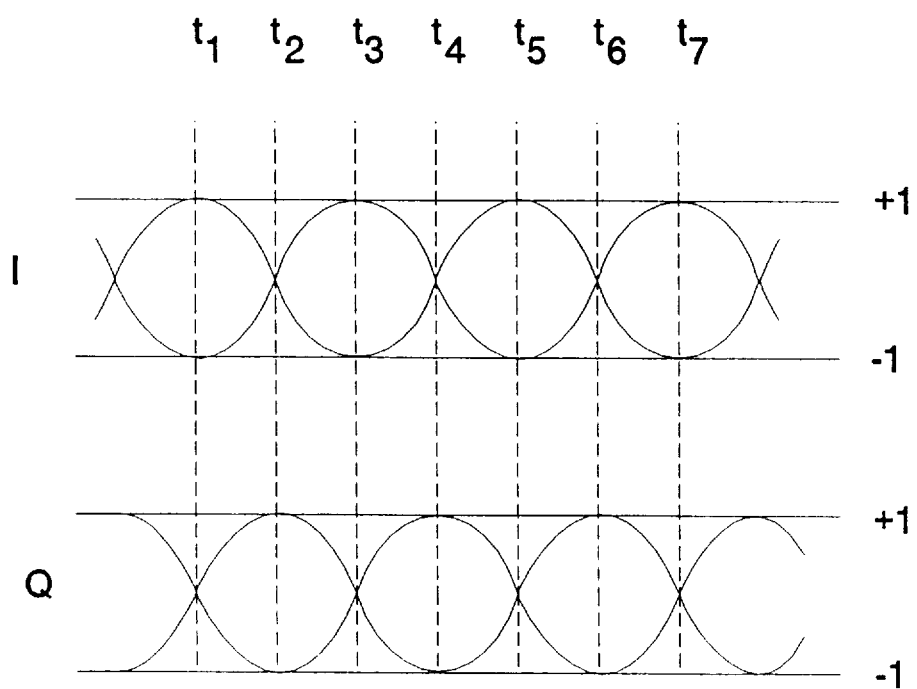
FIGS. 5(a)–5(h) illustrate signals and constellation points associated with various nodes of one embodiment of the inventive Offset 16 QAM transmitter.
Figure 5B:
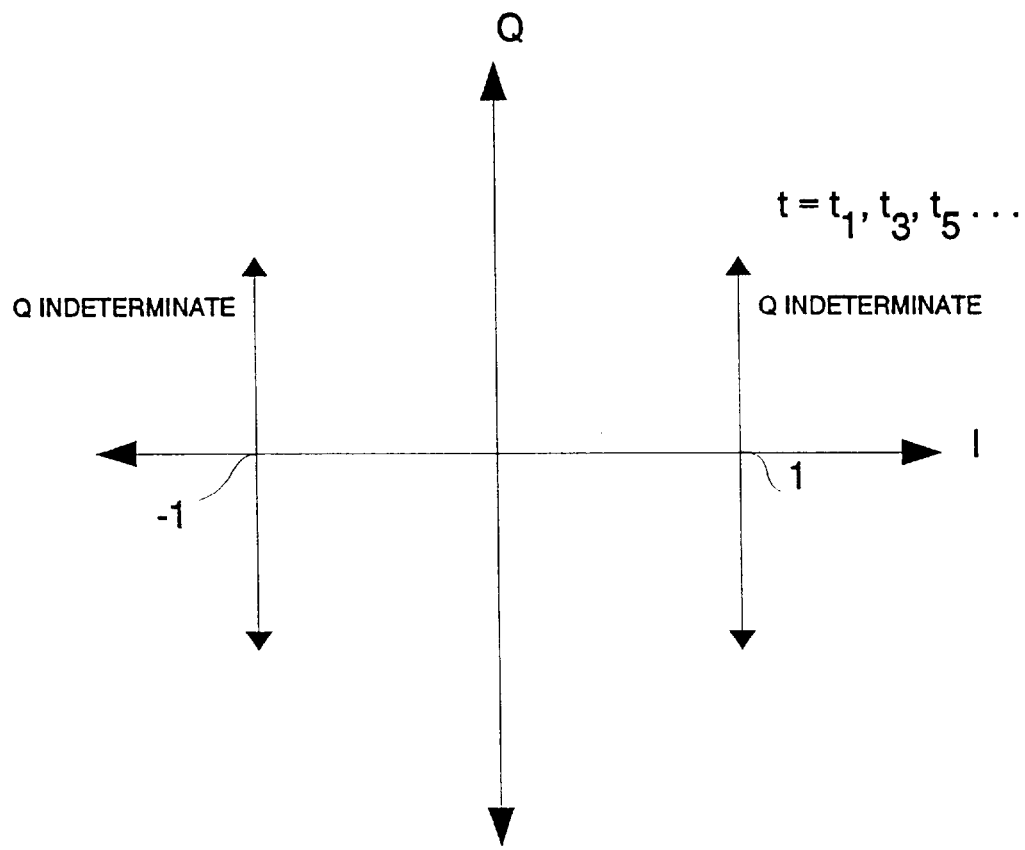
Figure 5C:
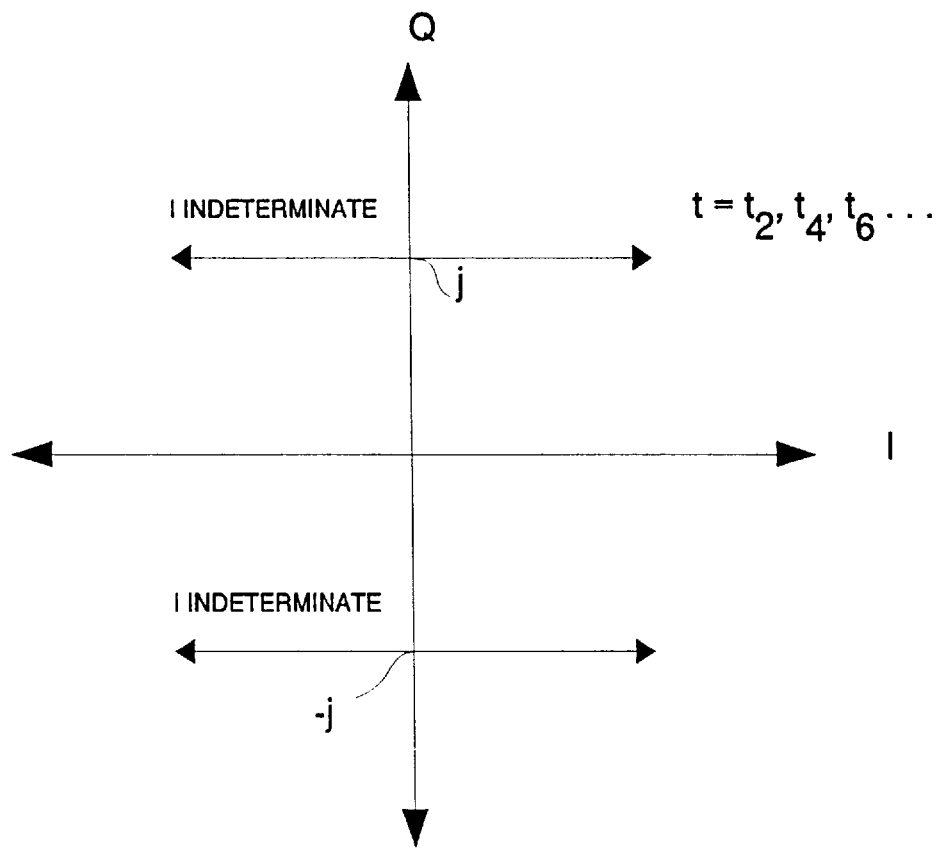
Figure 5D:
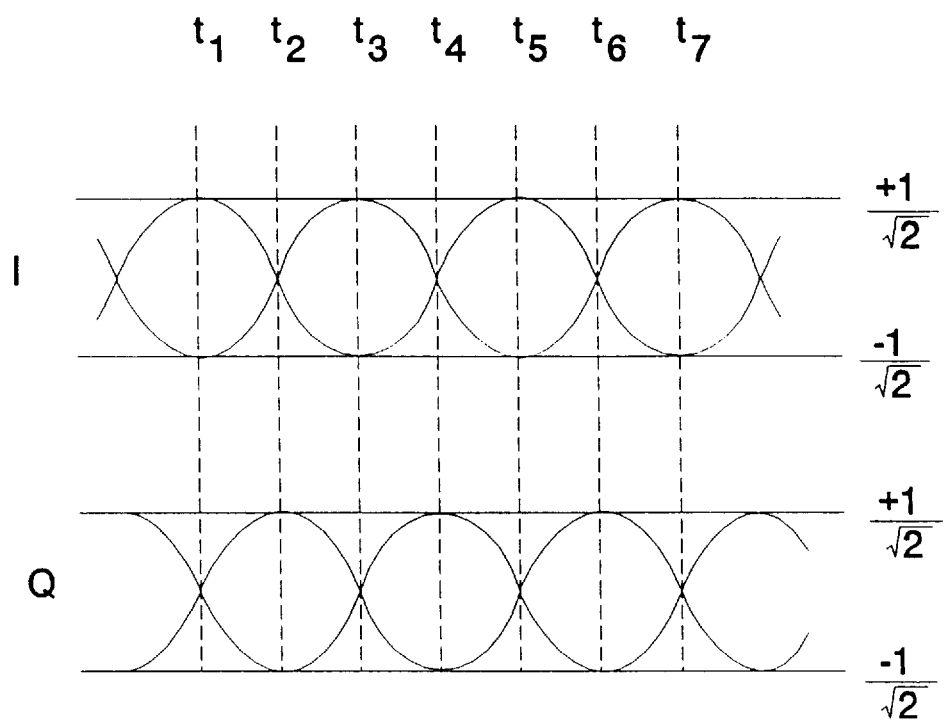
Figure 5E:
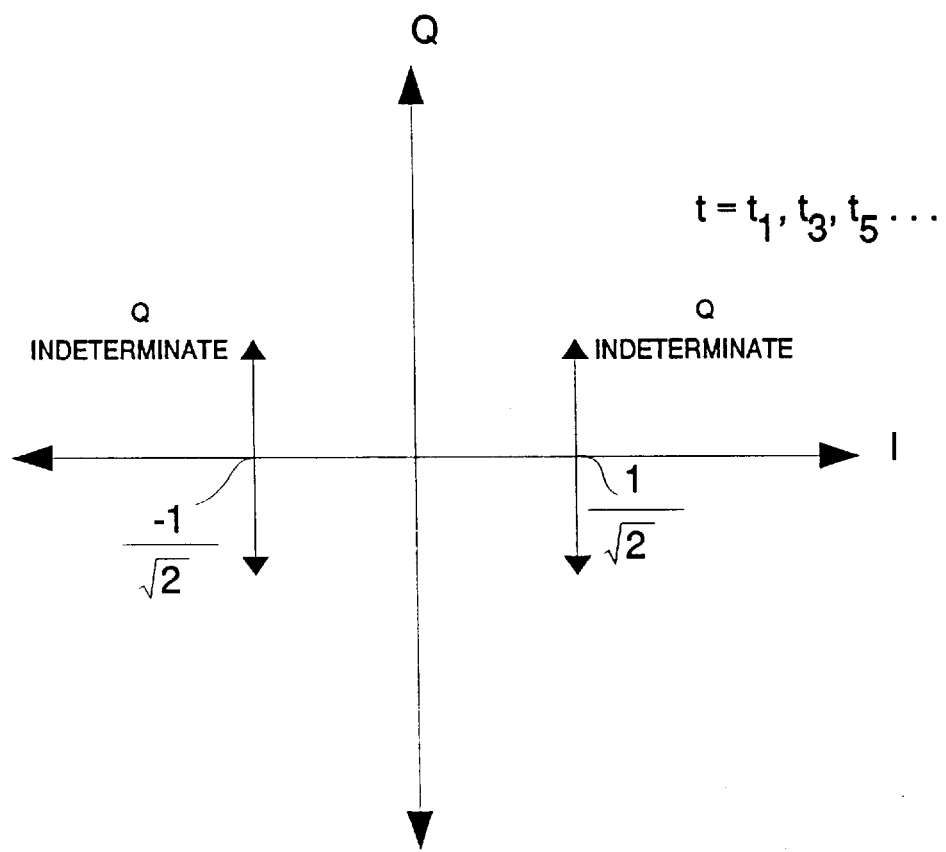
Figure 5F:
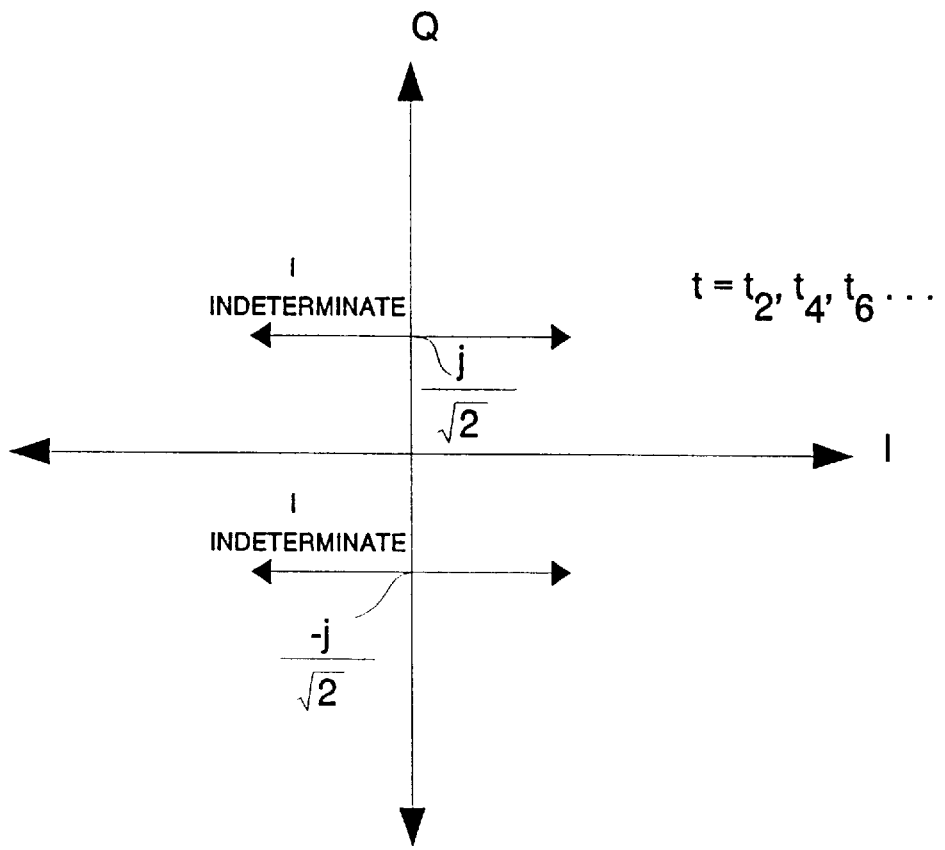

The two remaining information bits, $B_2 B_3$, are encoded into another Offset QPSK set of vertical and horizontal stripes by means of a second Offset QPSK modulator 405. The output signal from the second Offset QPSK modulator 405 is then supplied to a second constant-envelope amplifier 407 which faithfully amplifies that signal to a power level that is half that of the first constant-envelope amplifier 403, so that the amplitudes of the I and Q components will be $\frac{1}{\sqrt{2}}$ times that which are produced by the first constant-envelope amplifier 403. The amplified I and Q components that appear at the output of the second constant-envelope amplifier 407 are illustrated in FIG. 5(d). The amplified vertical stripes that appear during odd clock intervals are illustrated in FIG. 5(e), and the amplified horizontal stripes that appear at the output of the second constant-envelope amplifier 407 during even clock intervals are illustrated in FIG. 5(f).

Figure 4:
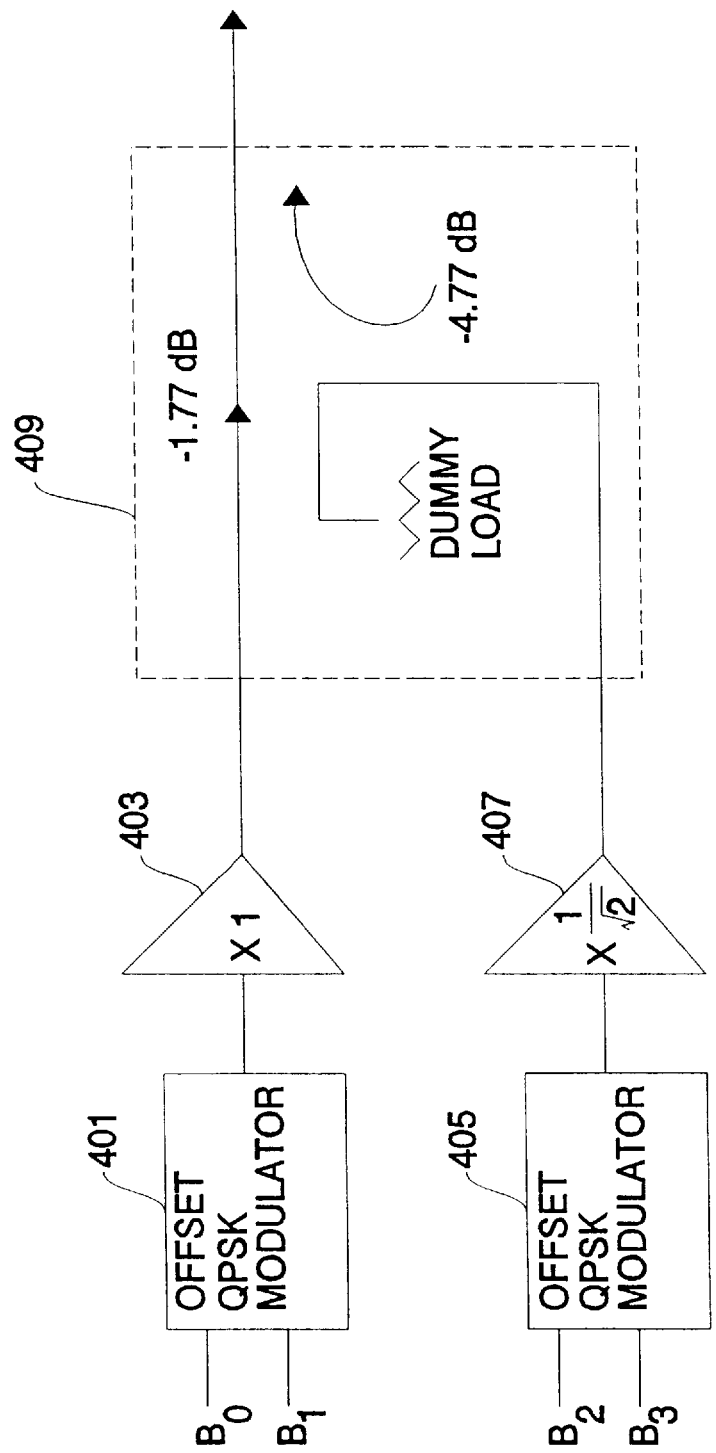
FIG. 4 is a block diagram of a transmitter employing OQPSK modulation to provide Offset 16 QAM in accordance with another aspect of the invention.

The outputs of the first and second constant-envelope amplifiers 403, 407 are then supplied to respective inputs of means for summing these signals, such as the directional coupler 409 shown in FIG. 4. The directional coupler 409 further scales the lower power signal from the second constant-envelope amplifier 407 by an amount that is $\frac{1}{\sqrt{2}}$ relative to the voltage scaling of the higher power signal from the first constant-envelope amplifier 403. Techniques for achieving this relative scaling in a directional coupler were described above with respect to the embodiment of FIG. 2. The further scaled signal is then added to the higher power signal.

Figure 5G:
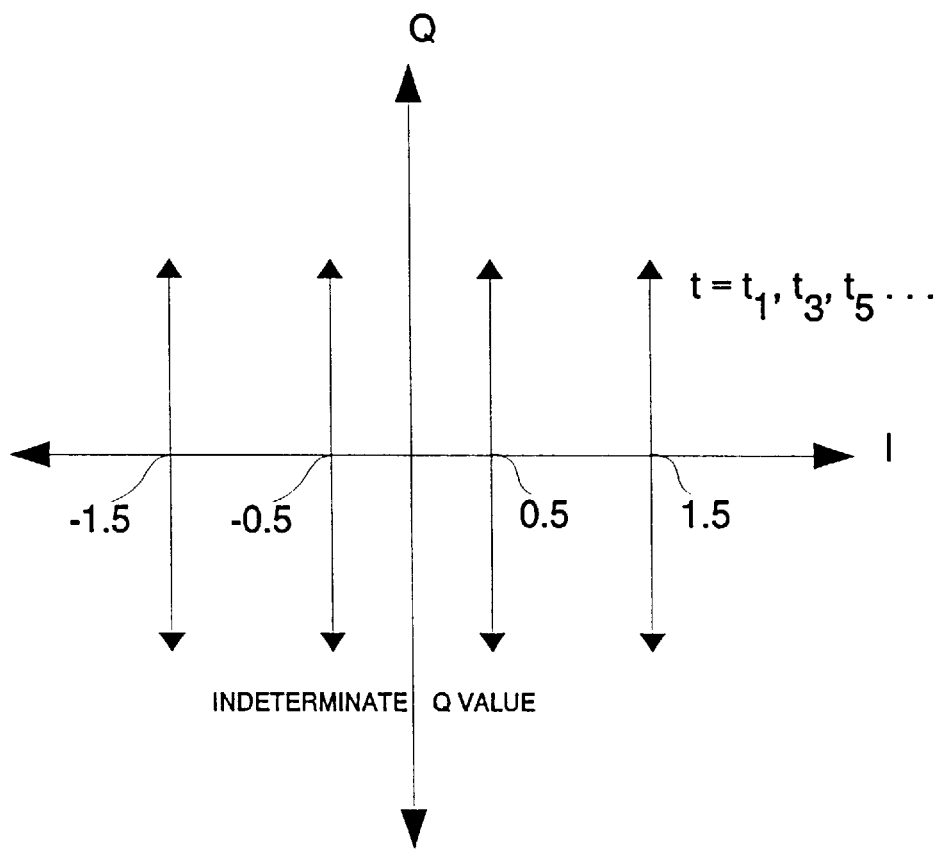
Figure 5H:
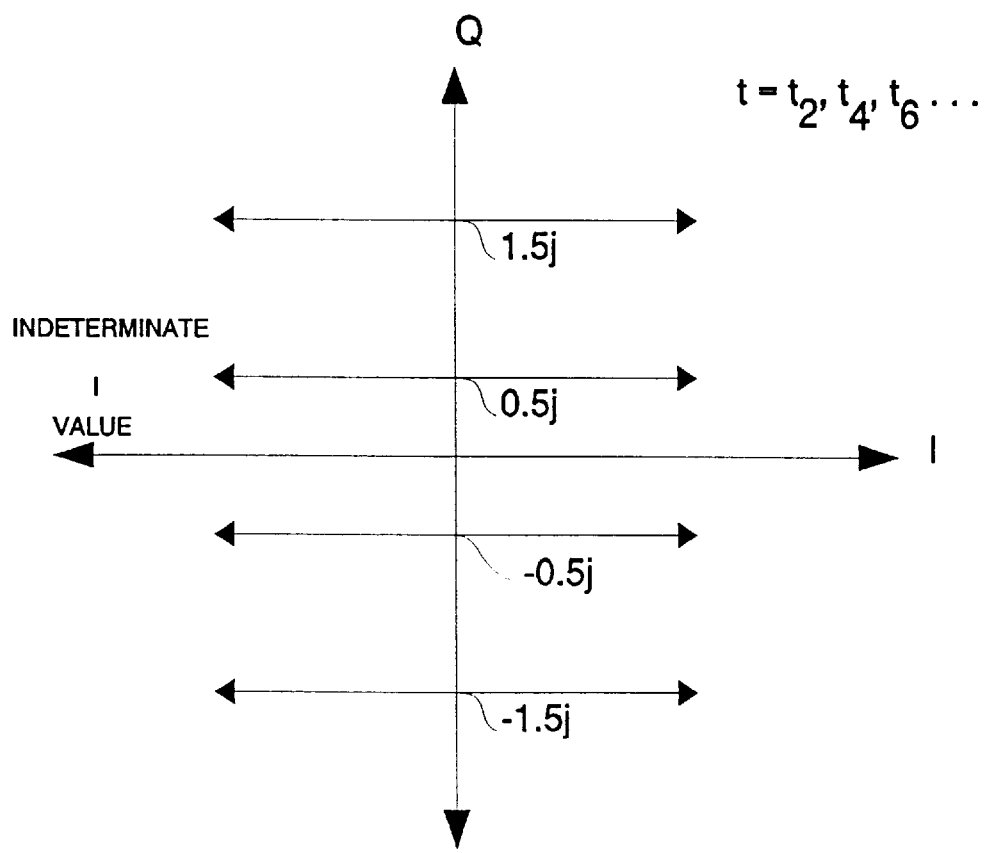

The further relative scaling of $\frac{1}{\sqrt{2}}$ of the lower power signal relative to the higher power signal, combined with its already $\frac{1}{\sqrt{2}}$ signal level relative to the higher power signal, combines to produce a signal of relative level ½ that of the higher power signal. Thus the higher power signal combines with a lower power signal further scaled to $$\frac{\pm 1 \pm j}{2}$$

to produce the vertical (real) stripes of FIG. 5(g) during odd clock times, and the horizontal (imaginary) stripes of FIG. 5(h) during even clock times. The vertical stripes may assume any one of the four values ±1.5, ±0.5 which are further reduced by the overall scaling of $\sqrt{\frac{2}{3}}$ produced by the directional coupler 409. Similarly, the horizontal stripes may assume any one of the four values ±1.5j, ±0.5j further reduced by the overall scaling of $\sqrt{\frac{2}{3}}$ produced by the directional coupler 409. By sampling the signal at an odd clock time and also at its corresponding even clock time, one of sixteen different values may be determined.

In another aspect of the invention, the principles outlined above may be extended to higher order QAM constellations having, for example, 64 or 256 points by the addition of a third or fourth constant envelope power amplifier with suitable power scaling and scaled addition using output couplers such that each contributes part of the output constellation in the binary voltage ratios 1:1/2:1/4 . . . , and so on. Such variations are considered to lie within the scope and spirit of this invention as described by the attached claims.

It is well known in the art that Offset QPSK, having transitions of no more than 90 degrees in phase angle, lends itself more readily to be spectrally contained when the vector trajectory is constrained to follow a constant-envelope circle by smoothing the changes in angle. The rate-of-change of phase angle is by definition the instantaneous deviation of the frequency of the signal from its nominal center frequency. If the phase angle changes from one data bit period to the next take place at a constant rate, i.e. by rotating the phase angle through ±90 degrees over one bit interval, the equivalent frequency change is one quarter of a cycle per bit period, or B/4 Hz, where B is the bitrate. Constant-rate phase changes of this kind give rise to a form of constant envelope OQPSK called Minimum Shift Keying (MSK).

In MSK, angle changes occur at a constant smooth rate, but their derivative, instantaneous frequency, changes in an abrupt fashion as the direction of the phase change alters from a clockwise to a counterclockwise rotation. Thus the angle is a continuous function, its derivative (frequency) is also a continuous function (but having abrupt steps), however the derivative of frequency has infinite discontinuities (dirac functions) at the abrupt step points.

The rate at which the spectrum falls off out of the wanted signal bandwidth is 6N dBs per octave, where N is the order of the lowest order derivative to contain discontinuities; thus because the second derivative of the phase angle contains discontinuities in the case of MSK, the spectrum falls off out-of-band at 12 dB per octave.

By further filtering the frequency waveform so that the abrupt steps are replaced by smooth changes in frequency, the discontinuities may be displaced from the second derivative of phase to ever higher orders, thus causing the spectrum to fall off faster. There is a limit to the spectral containment however whenever constant envelope modulation is used, as the actual components of the transmitted signal are proportional to the Sine and Cosine of the phase, which are non-linear functions. It is found empirically that under these conditions, a Gaussian-shaped low-pass filtering of the frequency waveform produces the best spectral containment achievable; this variant of MSK is known as Gaussian-filtered Minimum Shift Keying (GMSK) and is used in the European Digital Cellular system known as the Global System for Mobile communication (GSM). GMSK is in fact a family of modulations described by the parameter BT, the product of the Gaussian filter's −3 dB bandwidth and the information bit duration (bit period), T. Smaller values of BT provide tighter spectral containment at the expense of the signal not quite reaching the nominal constellation points before it starts on a new trajectory for the next bit period, a phenomenon known as "partial response", which makes the signal more difficult to decode efficiently. The compromise between spectral containment and the partial response phenomenon is left to the designers of any particular system.

Other frequency-waveform filters such as Nyquist filters may be used, that guarantee that the signal (at least as transmitted if not as received) passes exactly through the nominal constellation points, i.e. it does not exhibit the partial response effect.

Whenever a transition between constellation points has been smoothed by filtering, the shape of the transition (the trajectory) depends not just on the start and end points (the current data bit) but also on previous and future data bits. The number of consecutive data bits on which the shape of the trajectory depends is equal to the impulse response length of the filter. If this is a finite number of data bit periods L, as when a Finite Impulse Response (FIR) filter is used, then a finite number two-to-the-power L of different trajectory shapes is produced, corresponding to all possible patterns of L binary bits. These waveforms may be precomputed and stored in a look-up table as a series of waveform samples, and recalled based on an address formed using L consecutive data bits. Recalled samples may be digital-to-analog (D/A) converted to generate analog, I,Q modulating waveforms. The D/A convertors may also be eliminated by storing precomputed bit sequences of Delta-Sigma modulation representations of the waveforms, as described in U.S. Pat. No. 5,530,722 which is hereby incorporated herein by reference.

It has been explained above how a certain group of modulations comprising at least OQPSK, MSK and GMSK are closely related to each other and represent data by essentially the same constellation points, differing only in the shape of the transitions between constellation points. Any of these modulations may be used in the current invention to encode pairs of data bits, signals encoded with different pairs of data bits then being scaled and added to form the inventive Offset-QAM signal.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A transmitter for generating Quadrature Amplitude Modulated signals from data bits, the transmitter comprising:

first Quadrature Phase Shift Keying (QPSK) means for encoding a first pair of the data bits into one of four carrier signal phases, thereby producing a first QPSK signal;

second QPSK means for encoding a second pair of the data bits into one of four carrier signal phases, thereby producing a second QPSK signal;

a first power amplifier for amplifying the first QPSK signal to a first power level and supplying a first amplified signal at an output of the first power amplifier;

a second power amplifier for amplifying the second QPSK signal to a second power level and supplying a second amplified signal at an output of the second power amplifier; and combining means for combining the first and second amplified signals to produce a signal in which four data bits are encoded.

2. The transmitter of claim 1, further comprising means for smoothing a transition of the first and second QPSK signals from one phase encoded value to another phase encoded value.

3. The transmitter of claim 2, wherein the smoothing means comprises one or more low pass filters.

4. The transmitter of claim 2, wherein the smoothing means comprises means for using precomputed, digitized waveforms stored in a look-up table.

5. The transmitter of claim 4, wherein the look-up table holds precomputed waveforms that are precompensated for distortion in the first and second power amplifiers, whereby the output of the first and second power amplifiers contains reduced distortion.

6. The transmitter of claim 1, wherein each of the first and second power amplifiers is a class-C amplifier.

7. The transmitter of claim 1, wherein each of the first and second power amplifiers is a class-B amplifier.

8. An apparatus for encoding groups of data bits into a complex signal for transmission, the apparatus comprising:

means for encoding a first sub-group of the data bits into a real part of a complex signal at an odd instant of a clock; and means for encoding a second sub-group of the data bits into an imaginary part of the complex signal at an even instant of the clock.

9. The apparatus of claim 8, wherein:

the means for encoding the first sub-group comprises means for choosing one of a number of predetermined signal values according to bit polarities of the first sub-group of the data bits; and the means for encoding the second sub-group comprises means for choosing one of the number of predetermined signal values according to bit polarities of the second sub-group of the data bits.

10. The apparatus of claim 9, wherein the predetermined signal values are equispaced with respect to one another.

11. An apparatus for encoding a group of data bits into a complex signal for transmission, the apparatus comprising:

means for encoding a first pair of data bits into a first Offset Quadrature Phase Shift Keying (OQPSK) signal;

means for encoding a second pair of data bits into a second OQPSK signal;

a first power amplifier for amplifying the first OQPSK signal to a first power level;

a second power amplifier for amplifying the second OQPSK signal to a second power level; and combining means for combining outputs of the first and second power amplifiers to produce a complex vector modulated signal in which four data bits are encoded.

12. The apparatus of claim 11, further comprising smoothing means for smoothing transitions of the first and second OQPSK signals from one encoded signal value to another encoded signal value, whereby spectral containment of the complex vector modulated signal is obtained.

13. The apparatus of claim 12, wherein the smoothing means comprises at least one low pass filter for smoothing transitions of the first and second OQPSK signals from one encoded signal value to another encoded signal value.

14. The apparatus of claim 12, wherein the smoothing means comprises means for using precomputed, stored digitized transition waveforms to smooth transitions of the first and second OQPSK signals from one encoded signal value to another encoded signal value.

15. The apparatus of claim 14, wherein the stored digitized transition waveforms are precompensated for distortion in the first and second power amplifiers such that amplified signals supplied by the first and second power amplifiers contain substantially reduced distortion.

16. The apparatus of claim 14, wherein transitions of the stored digitized transition waveforms follow a constant amplitude trajectory.

17. The apparatus of claim 16, wherein the constant amplitude trajectory is formed using Gaussian Minimum Shift Keying modulation.

18. The apparatus of claim 11, wherein the first and second power amplifiers are constant envelope power amplifiers.

19. The apparatus of claim 11, wherein the first and second power amplifiers are operated at output saturation.

20. The apparatus of claim 11, wherein the first and second power amplifiers are class-C amplifiers.

21. The apparatus of claim 11, wherein the first and second power amplifiers are class-B amplifiers.

22. A method for generating Quadrature Amplitude Modulated signals from data bits, the method comprising:

utilizing Quadrature Phase Shift Keying (QPSK) to encode a first pair of the data bits into one of four carrier signal phases, thereby producing a first QPSK signal;

utilizing QPSK to encode a second pair of the data bits into one of four carrier signal phases, thereby producing a second QPSK signal;

generating a first amplified signal by amplifying the first QPSK signal to a first power level;

generating a second amplified signal by amplifying the second QPSK signal to a second power level; and combining the first and second amplified signals to produce a signal in which four data bits are encoded.

23. The method of claim 22, further comprising the step of smoothing a transition of the first and second QPSK signals from one phase encoded value to another phase encoded value.

24. The method of claim 23, wherein the step of smoothing comprises the step of using one or more low pass filters to smooth the transition of the first and second QPSK signals from one phase encoded value to another phase encoded value.

25. The method of claim 23, wherein the step of smoothing comprises the step of using precomputed, digitized waveforms stored in a look-up table to smooth the transition of the first and second QPSK signals from one phase encoded value to another phase encoded value.

26. The method of claim 25, wherein the look-up table holds precomputed waveforms that are precompensated to reduce distortion that occurs in the steps of generating the first and second amplified signals.

27. The method of claim 22, wherein:

the step of generating the first amplified signal comprises the step of using a first class-C amplifier to amplify the first QPSK signal to the first power level; and the step of generating the second amplified signal comprises the step of using a second class-C amplifier to amplify the second QPSK signal to the second power level.

28. The method of claim 22, wherein:

the step of generating the first amplified signal comprises the step of using a first class-B amplifier to amplify the first QPSK signal to the first power level; and the step of generating the second amplified signal comprises the step of using a second class-B amplifier to amplify the second QPSK signal to the second power level.

29. A method of encoding groups of data bits into a complex signal for transmission comprising the steps of:

encoding a first sub-group of the data bits into a real part of a complex signal at an odd instant of a clock; and encoding a second sub-group of the data bits into an imaginary part of the complex signal at an even instant of the clock.

30. The method of claim 29, wherein:

the step of encoding the first sub-group comprises choosing one of a number of predetermined signal values according to bit polarities of the first sub-group of the data bits; and the step of encoding the second sub-group comprises choosing one of the number of predetermined signal values according to bit polarities of the second sub-group of the data bits.

31. The method of claim 30, wherein the predetermined signal values are equispaced with respect to one another.

32. A method of encoding a group of data bits into a complex signal for transmission comprising the steps of:

encoding a first pair of data bits into a first Offset Quadrature Phase Shift Keying (OQPSK) signal;

encoding a second pair of data bits into a second OQPSK signal;

amplifying the first OQPSK signal to a first power level using a first power amplifier;

amplifying the second OQPSK signal to a second power level using a second power amplifier; and combining outputs of the first and second power amplifiers to produce a complex vector modulated signal in which four data bits are encoded.

33. The method of claim 32, further comprising the step of smoothing transitions of the first and second OQPSK signals from one encoded signal value to another encoded signal value, whereby spectral containment of the complex vector modulated signal is obtained.

34. The method of claim 33, wherein the step of smoothing comprises using a low pass filter to smooth transitions of the first and second OQPSK signals from one encoded signal value to another encoded signal value.

35. The method of claim 33, wherein the step of smoothing comprises using precomputed and stored digitized transition waveforms to smooth transitions of the first and second OQPSK signals from one encoded signal value to another encoded signal value.

36. The method of claim 35, wherein the stored digitized transition waveforms are precompensated for distortion in the first and second power amplifiers such that amplified signals supplied by the first and second power amplifiers contain substantially reduced distortion.

37. The method of claim 35, wherein transitions of the stored digitized transition waveforms follow a constant amplitude trajectory.

38. The method of claim 37, wherein the constant amplitude trajectory is formed using Gaussian Minimum Shift Keying modulation.

39. The method of claim 32, wherein the first and second power amplifiers are constant envelope power amplifiers.

40. The method of claim 32, wherein the first and second power amplifiers are operated at output saturation.

41. The method of claim 32, wherein the first and second power amplifiers are class-C amplifiers.

42. The method of claim 32, wherein the first and second power amplifiers are class-B amplifiers.

\* \* \* \* \*